(12) United States Patent
Ogawa et al.

(10) Patent No.: US 6,208,653 B1
(45) Date of Patent: Mar. 27, 2001

(54) METHOD AND APPARATUS FOR CONTROLLING A FLOW BETWEEN TERMINALS IN AN ATM NETWORK

(75) Inventors: Makoto Ogawa; Motoo Nishihara; Michio Masuda, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/039,556

(22) Filed: Mar. 16, 1998

(30) Foreign Application Priority Data

Mar. 18, 1997 (JP) .................................... 9-064667

(51) Int. Cl.[7] .................................... H04L 12/28
(52) U.S. Cl. .................... 370/395; 370/231; 370/235; 370/229
(58) Field of Search .................... 370/395, 389, 370/396, 397, 398, 399, 229, 230, 231, 232, 236, 237

(56) References Cited

U.S. PATENT DOCUMENTS

| 5,528,590 | * | 6/1996 | Iidaka | 370/395 |
| 5,539,747 | | 7/1996 | Ito et al. | 370/94.2 |
| 5,831,973 | * | 11/1998 | Yokotani | 370/236 |
| 5,959,991 | * | 9/1999 | Hatono | 370/395 |
| 5,963,541 | * | 10/1999 | Koga | 370/229 |
| 5,999,514 | * | 12/1999 | Kato | 370/231 |
| 6,094,418 | * | 7/2000 | Soumiya | 370/231 |

FOREIGN PATENT DOCUMENTS 7-66820    3/1995    (JP) .

* cited by examiner

Primary Examiner—Douglas Olms
Assistant Examiner—Ricardo M. Pizarro
(74) Attorney, Agent, or Firm—Foley & Lardner

(57) ABSTRACT

The present invention provides a gateway unit which comprises a detecting unit for detecting the congestion from an RM cell from the ATM cell, for discriminating a TCP data gram (TCPDG) from a packet received during the congestion and for acquiring a sequence number of the TCPDG, a sending unit for sending an ACK having a window-controlled value to a transmitting terminal so as to limit a data transmission, and a discarding unit for discarding the packet from the transmitting terminal during the congestion after the confirmation of packet. During the congestion in the ATM network, a pseudo acknowledgment is sent from the gateway unit so as to indicate that the receiving terminal cannot receive data. This restrains the transmission of TCPDG from the transmitting terminal.

10 Claims, 6 Drawing Sheets

METHOD AND APPARATUS FOR CONTROLLING A FLOW BETWEEN TERMINALS IN AN ATM NETWORK

BACKGROUND OF THE INVENTION

1. Field of the Invention

The present invention relates to a flow control method and apparatus. More specifically, the present invention relates to a flow control method and apparatus for a data transmission between terminals during a congestion state in an ATM network having a network arrangement in which terminals connected to an existing LAN via the ATM network are interconnected.

2. Description of the Related Art

Heretofore, a flow control method and apparatus in an ATM network has been used, for example, as disclosed in Japanese Patent Laid-open No. 7-66820/1995. As disclosed in Japanese Patent Laid-open No. 7-66820/1995, a control is performed so as to stop a cell inflow from a user who transmits a cell causing a state of congestion, the cell inflow being stopped during the congestion state in a communication network. By this conventional method, a discarding of a cell (or cells) during the congestion state is avoided, and a retransmission of the discarded cell (or cells) is avoided.

FIG. 6 is a block diagram showing an example of a conventional flow control system. Numerals 61 through 65 denote user side units that are control sections possessed by the users. Numeral 66 denotes a network side unit and relates to a flow control on a switch side. Numerals 67 through 70 denote traffic control units in the network side unit 66, which are present for each input/output port of an N×N switch 71. Numerals 72 and 73 denote output buffers which are present for each input/output port of the switch 71. Numeral 74 denotes a cell discardability determining section for detecting a state of congestion of an output buffer and for informing the traffic control units 67 through 70 of the congestion detection. The state of congestion of the output buffer may be made by determining that the buffer has less than a certain amount of unused space currently available (i.e., more than 90% full). Numerals 75 through 78 denote transmission paths for connecting the network side unit to the user side unit. In general, there are a plurality of traffic control units, and the user side units may be connected in a ring configuration, as are units 61 and 62.

Next, an operation of a conventional flow control system and method will be described. When the user side units 61 through 65 detect a particular cell having reset instruction information (called a "reset cell") that is sent to the user side units by the traffic control units 67 through 70, an authorization to transmit a predetermined number of cells (e.g., window size) is given to the user side units. The predetermined number of cells are then transmitted to the transmission paths 75 through 78 by the user side units prior to the detection of another reset cell. When the traffic control units 67 through 70 confirm that all the user side units 61 through 65 cannot transmit any more cells or that no data to be transmitted exists, a reset cell is transmitted to the user side units. Also, when a reset cell timer expires, a reset cell is transmitted to the user side units to maintain a particular cell transfer rate. Not shown in FIG. 6 are sources providing data to the user side units via local area networks or the like. The user side units 61–65 convert the data into data packets that are sent out on the transmission paths 75–78.

When one or more of the cell buffers 72 and 73 are congested, the cell discardability determining section 74 signals the traffic control units that provide cells to the congested cell buffers, so as to inform them of the need to limit a cell inflow. Based on this, the traffic control units stop or slow down the rate of the transmission of the reset cell to the user side units, so as to control (that is, slow down or stop) the cell transmission rate by the user side units.

A first problem with the conventional flow control system as described above is that a throughput between user terminals is reduced in a network arrangement that provides connectivity between LANs using an existing network such as an Ethernet, with inter-LAN connectivity being via an ATM network.

The reason for this problem is that the control of the flow control system is performed within the ATM network. During a state of congestion, a data output is controlled, not in the terminal of the existing LAN, but in a user side unit (gateway) terminating the ATM network. Thus, data continues to be transmitted from the terminal even during the state of congestion. When the control is performed so as to stop the cell transmission from the gateway to the ATM network, the data from a transmitting terminal is accumulated in a buffer in the user side unit. The transmitted data is transmitted after a considerable delay. Furthermore, the transmitted data may be discarded due to an overflow of the buffer.

A second problem with the conventional flow control system is that a time lag occurs during a time interval from a detection of congestion to a stop of data transmission. As a result, when a plurality of user side units are present, even if the state of congestion is detected, the control is not immediately started. It may thus take some amount of time to release the congestion.

The second problem occurs since an active control for a user side unit is not performed during the state of congestion. During the state of congestion, the traffic control unit only stops an information transmission that instructs the user side unit to reset a transmission disabled state. Therefore, until each user side unit finishes outputting the transmittable number of cells, If the flow control is not started.

SUMMARY OF THE INVENTION

It is an object of the present invention to provide a flow control method in which, even when a congestion occurs in an ATM network in a network arrangement interconnecting between LANs using an existing network such as an Ethernet via the ATM network, a discard of data gram from a transmitting terminal is restrained, thereby permitting an improvement of a throughput at a packet level.

It is another object of the present invention to provide a method of immediately performing a data transmission control during the congestion. There is provided a flow control method which can reduce a time prior to a congestion release by immediately controlling a data transmission source during the congestion.

In order to accomplish these and other objects, the present invention provides a method for controlling a flow between terminals in an ATM network. The ATM network comprises a gateway unit for accommodating a user LAN, for converting a packet transmitted from the user LAN into a plurality of ATM cells, for transferring the ATM cells to the ATM network, for converting the ATM cells received from the ATM network into the packet and for transferring the packet to the user LAN. The ATM network also comprises an ATM switch disposed in the ATM network, for transferring to a predetermined path in accordance with a VPI and a VCI of the ATM cell, for detecting a congestion and for sending an RM cell to the transmission-originating gateway unit, the RM cell including the described congestion information. The ATM network also includes a transmitting terminal disposed in the user LAN, for communicating with a receiving terminal in another existing LAN via the ATM network by the packet including a TCP data gram. The gateway unit adjusts, by a read from an output buffer, a cell output rate to a VC congested in accordance with a possible cell rate written in the RM cell received when the congestion is detected from the RM cell, sends a pseudo ACK packet to the transmitting terminal so as to stop the transmission of TCP data gram received from the corresponding LAN to the congested VC, the ACK packet indicating that the receiving terminal cannot receive the data, and discards all the packets passing through the congested VC transmitted from the transmitting terminal during the detection of congestion.

The adjusting step of the gateway unit comprises a first adjusting step for previously deciding a priority in the transmitting terminal and for controlling the transmission of the TCP data gram transmitted from a low-priority terminal when no increase of cell rate of the transmission-originating gateway unit is discriminated from the RM cell congestion information, and a second adjusting step for controlling the transmission of the TCP data gram transmitted from all the terminals when no increase of cell rate and a congestion detection are discriminated.

The sending step of the gateway unit comprises the step of sending a pseudo ACK packet to the transmitting terminal so as to hold the cell exceeding a threshold in the output buffer limiting the cell output to the ATM network and so as not to discard the cell during the detection of congestion by the RM cell, the pseudo ACK packet indicating that the receiving terminal cannot receive the TCP data gram transmitted from the transmitting terminal when the cell exceeding the threshold is held in the output buffer.

The discarding step of the gateway unit comprises a first discarding step for discarding, by the transmitting gateway unit, all the packets alone including a UDP data gram to the congested VC from the receiving terminal when no increase of cell rate of the transmission-originating gateway unit is discriminated from the RM cell congestion information, and a second discarding step for sending a pseudo ACK packet to the transmitting terminal and for discarding all the packets from the transmitting terminal so as to stop the transmission of TCP data gram when no increase of cell rate and a congestion generating state are discriminated, the pseudo ACK packet indicating that the receiving terminal cannot receive the TCP data gram to be transmitted to the congested VC.

In a flow control system for limiting a data transmission from a transmitting terminal during a congestion in an ATM network interconnecting LANS, a gateway unit for accommodating a user LAN, for converting a packet transmitted form the user LAN into a plurality of ATM cells, for transferring the ATM cells to the ATM network, for converting the ATM cells received from the ATM network into the packet and for transferring the packet to the user LAN, the gateway unit which comprises a cell output buffer for transmitting the cell to the ATM network, a cell input buffer for receiving the cell from the ATM network, a packet receiving buffer for receiving the packet from an existing LAN, a cell forming section for forming the received packet into the ATM cell, a packet assembling section for assembling the ATM cell into the packet in the existing LAN, a packet transmitting buffer for transmitting the packet to the existing LAN, a congestion detecting section for detecting the congestion in an RM cell to be transmitted from the ATM network, a packet discard controlling section for discarding the received packet during the congestion, a TCP data gram discriminating section for discriminating a TCP data gram from the packet received from the existing LAN during the RM cell congestion detection and for acquiring a sequence number of the TCP data gram, and an ACK generating section for generating an ACK packet so as to stop a TCP data transmission to the transmitting terminal, the ACK packet being arranged so that an ACK number may be made equal to the sequence number of the received TCP data gram and a window value may be equal to "0".

More specifically, a flow control method of the present invention comprises a combination of a step of feeding back the congestion information in a relay network from a RAM cell to an ATM network termination so as to discriminate the information at the ATM network termination and a step of controlling a TCP window so as to control the TCP data transmission between the terminals, and a step of sending a pseudo acknowledgment indicating that the receiving terminal cannot receive the data to the transmitting terminal in the gateway which is a terminating point of the ATM network during the congestion of the ATM network so as to stop the transmission of TCP data gram. The gateway, to which the present invention is applied, comprises a step of detecting the congestion from the RM cell received from the ATM network, discriminating the TCP data gram from the packet received from the terminal on the existing LAN during the congestion and acquiring the sequence number of the TCP data gram, a step of sending the ACK, which is window-controlled so as to control the data transmission, to the transmitting terminal, and a step of discarding the packet from the receiving terminal during the congestion after the confirmation of packet.

BRIEF DESCRIPTION OF THE DRAWINGS

The above-mentioned objects and advantages of the invention will become more fully apparent from the following detailed description when read in conjunction with the accompanying drawings, with like reference numerals indicating corresponding parts throughout, and wherein.

DETAILED DESCRIPTION OF THE PREFERRED EMBODIMENTS

A preferred embodiment of the present invention will be described in detail with reference to the accompanying drawings.

Figure 1:
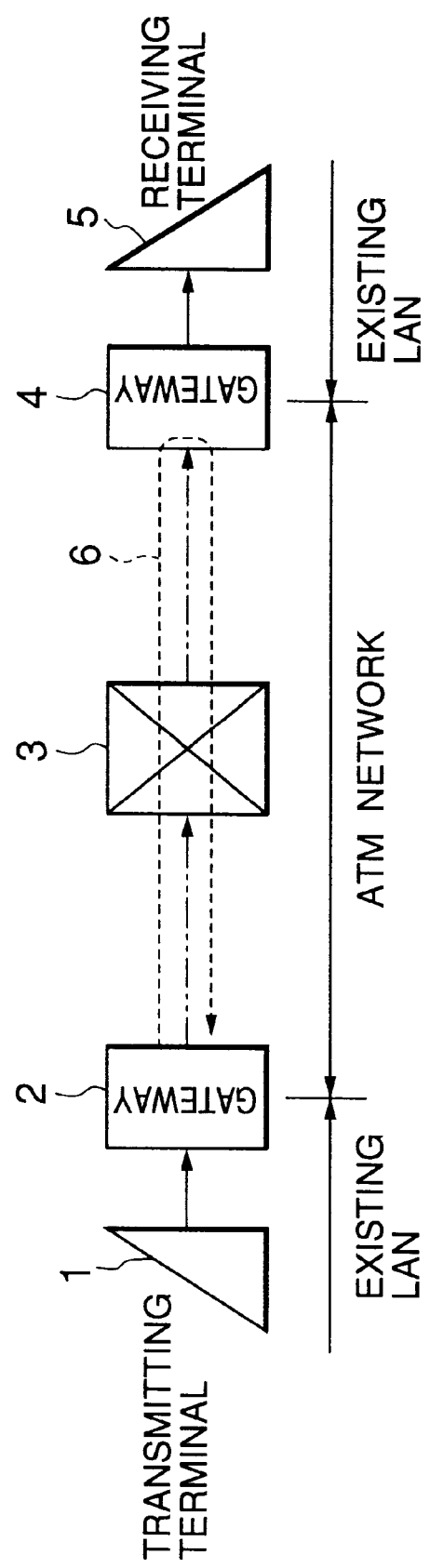
FIG. 1 is a block diagram showing a network arrangement for performing a flow control method, according to an embodiment of the present invention.

FIG. 1 shows a network arrangement of an embodiment of the present invention. A transmitting terminal 1 on an existing LAN is connected to a receiving terminal 5 via an ATM network. The existing LAN and the ATM network are connected to each other via gateways 2 and 4. An ATM switch 3 performs cell transfer and is capable of detecting a state of congestion on the ATM network. Congestion generation information is written in a Resource Management (RM) cell by the switch 3 and is transmitted therefrom. An RM cell is created for each separate connection by the gateway, and is output periodically by the gateway.

In FIG. 1, numeral 6 denotes a transfer route of the RM cell. The RM cell is transmitted from the transmitting side gateway 2 on a same path as a data cell. The RM cell is sent to the transmitting side gateway 2 from the receiving side gateway 4.

Figure 2:
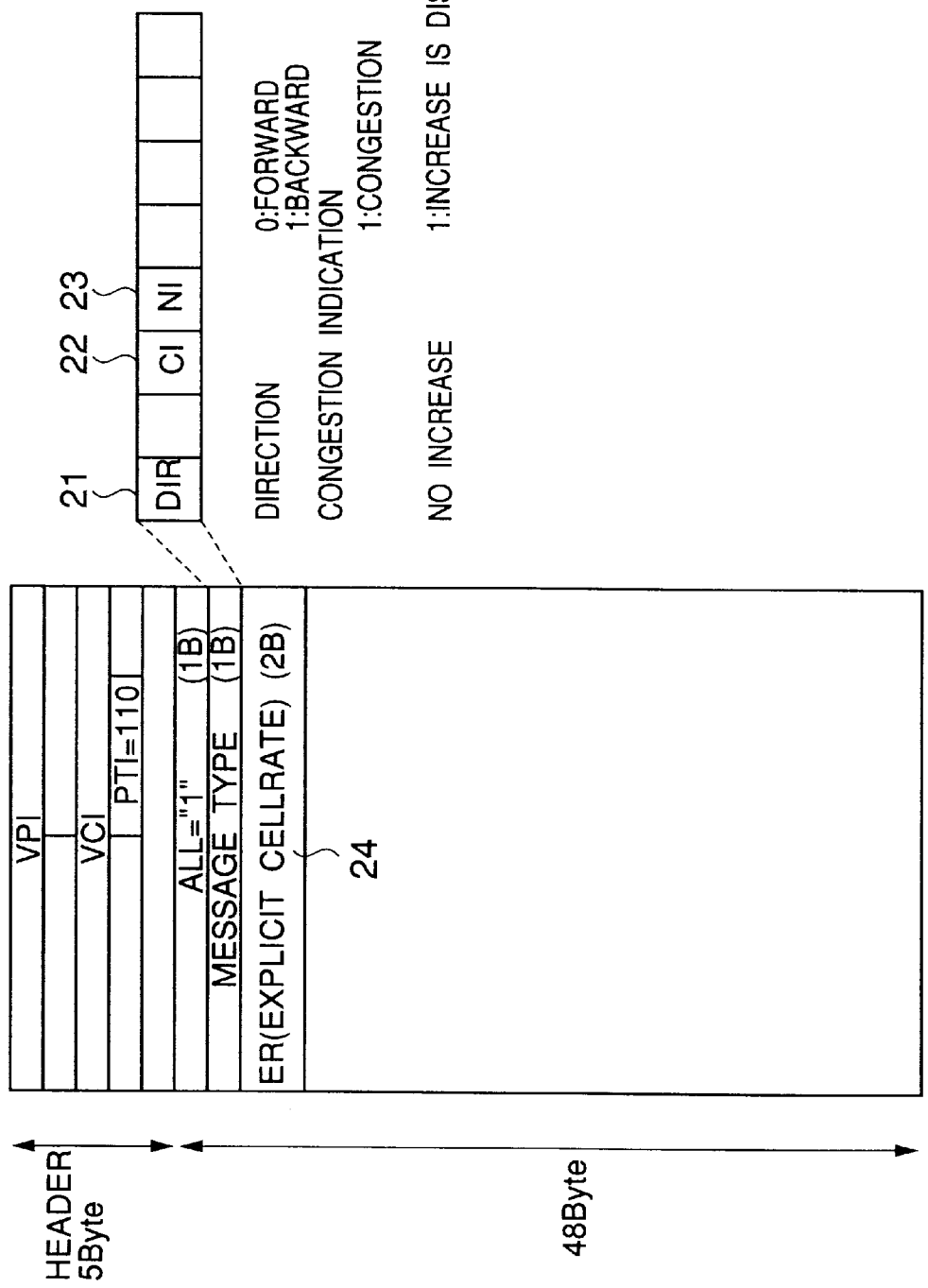
FIG. 2 shows a format of an RM cell of an embodiment according to the present invention.

FIG. 2 shows a format of the RM cell to be feedback-controlled between the gateways. The RM cell comprises 53 bytes, and includes a header portion of 5 bytes, and a payload portion of 48 bytes. The same virtual path identifier (VPI) and virtual channel identifier (VCI) as transmitted data are entered in a VPI field and a VCI field of the header portion of the RM cell, so as to pass the RM cell through the same connection as the data cells. A 3-bit payload type (PT) field is equal to "110" in the RM cell. The first byte of the payload portion is all "1". The first byte of the payload portion is utilized with the value in the PT field and can be used to discriminate the RM cell from the data cell.

The second byte of the payload portion includes a direction indication bit (DIR) 21, a congestion indication bit (CI) 22, and a no increase of cell rate bit (NI) 23. The DIR bit 21 indicates a direction of the RM cell relative to the direction of data cell transmission. The DIR bit 21 is set up in a forward direction and a backward direction in the transmitting side gateway 2 and the receiving side gateway 4, respectively. The CI bit 22 is set to "1" and "0" during the congestion state and during the non-congestion state, respectively, by the ATM switch 3 in the ATM network. When the cell rate is increased in the ATM switch 3 resulting in the occurrence of congestion, the NI bit 23 is set to "1". When the increase of the cell rate does not cause congestion to occur, the NI bit 23 is set to "0". The third and fourth bytes of the payload constitute an ER (explicit cell rate) field 24. A value corresponding to a designated cell rate that should not cause congestion to occur is written into the ER field 24 by the ATM switch 3. The ATM switch 3 determines the appropriate value to be written into the ER field 24 based on, for example, available buffer space and cell flow output rate.

Figure 3:
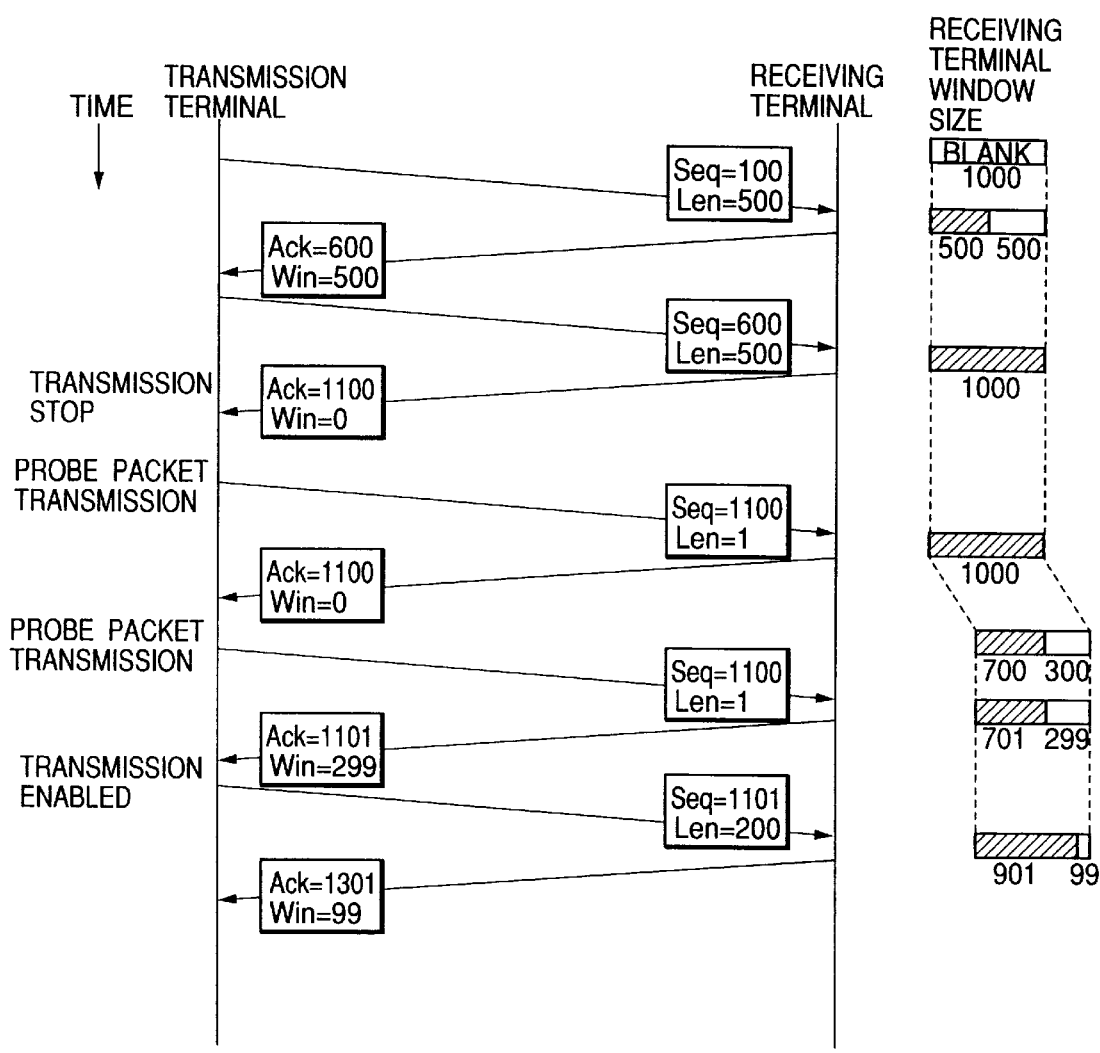
FIG. 3 shows a flow by a window control performed between terminals, according to an embodiment of the present invention.

FIG. 3 shows an example of a flow of a conventional communication performed by a transmission control protocol (TCP) data gram between the transmitting and receiving terminals. In a TCP, in accordance with an amount of transmittable data transmitted from the receiving terminal (for example, window value=500 in FIG. 3), the TCP data gram having a data length equal to tin or less than the window value is transmitted by the transmitting terminal. The receiving terminal sends an ACK number (=1100) and a blank window value (=0) to the transmitting terminal, where the ACK number is determined by the addition of the transmitted data length (=500) to a sequence number (=600). When the transmitting terminal transmits the amount of data designated by the window value of the receiving terminal, a next transmission is in a stand-by state until the window value included in a TCP data gram sent from the receiving side is non-blank (i.e., greater than 0). In the stand-by state, the transmitting terminal periodically outputs probe packets having a data length of "1" and a sequence number (=1100 in FIG. 3) corresponding to the ACK number, until a data gram is received by the transmitting terminal that has a new ACK number (=1101 in FIG. 3) and a non-zero window value. At that point in time, normal transmission is enabled again.

Figure 4:
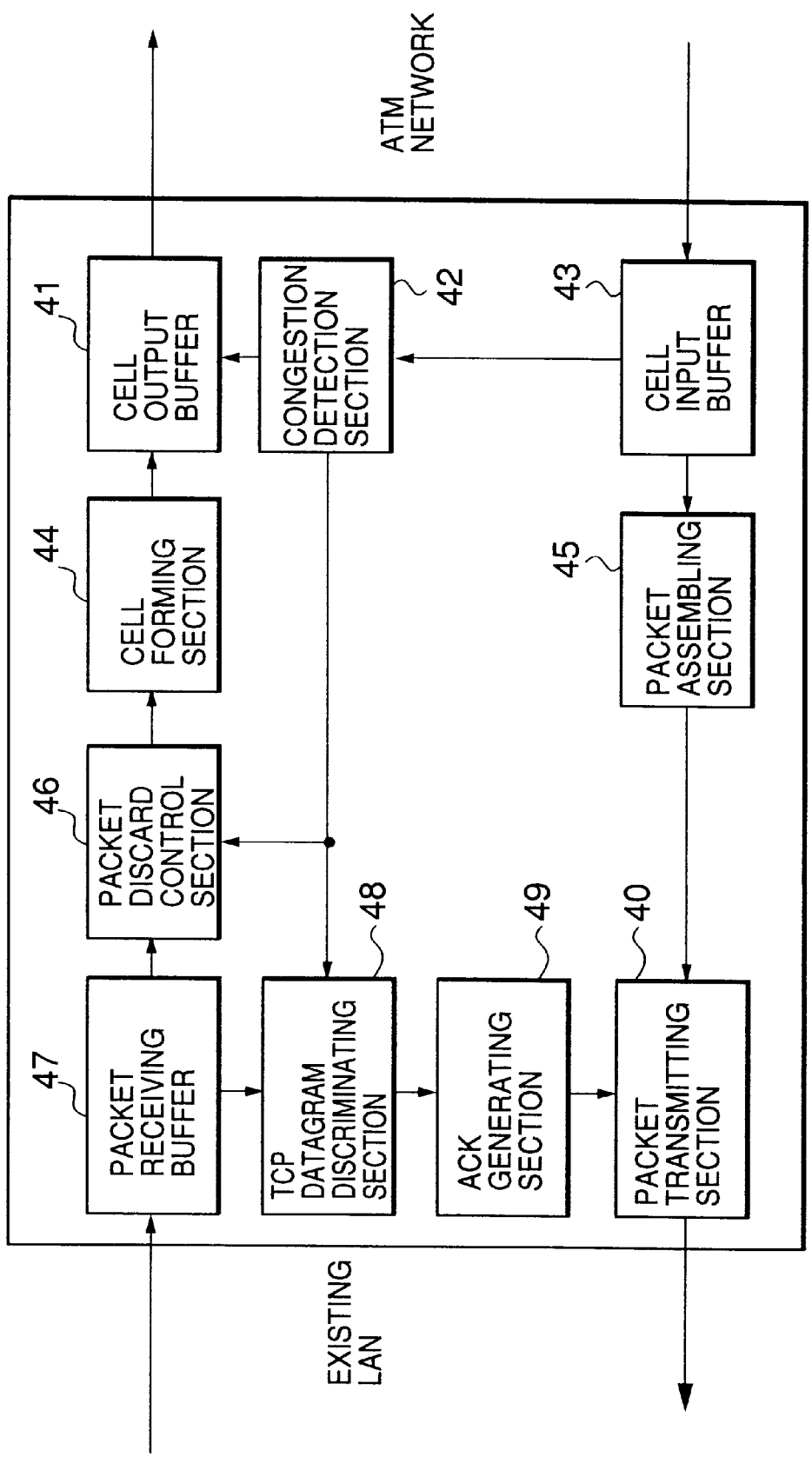
FIG. 4 is a block diagram showing a construction of a gateway unit according to an embodiment of the present invention.

Next, a detailed arrangement of the gateway to which the present invention is applied will be described. FIG. 4 is a block diagram showing an exemplary arrangement of the gateways 2 and 4 of the embodiment of the present invention. In FIG. 4, numeral 41 denotes a cell output buffer. Numeral 43 denotes a cell input buffer for receiving a cell from the ATM network. Numeral 44 denotes a cell forming section for forming a received packet into an ATM cell. Numeral 45 denotes a packet assembling section for assembling the ATM cell into a packet on the existing LAN. Numeral 42 denotes a congestion detecting section. When the congestion detecting section 42 detects the congestion state in an RM cell transmitted from the ATM network, it controls the cell output buffer 41 to reduce a cell transmission rate. Numeral 46 denotes a packet discard controlling section for discarding a received packet during the congestion state. Numeral 47 denotes a packet receiving buffer for receiving a packet from the existing LAN. Numeral 48 we denotes a TCP data gram discriminating section for discriminating a packet having a TCP data gram format from a packet having another format received from the existing LAN. Packets having formats other than TCP include RSVP (resource reservation protocol), UDP (user data protocol) and ICMP (internet control management protocol). Numeral 49 denotes an ACK generating section for generating an ACK packet for the TCP data gram discriminated by the TCP data gram discriminating section 48. Numeral 40 denotes a packet transmitting buffer for temporarily holding a packet to be output to the existing LAN.

In the gateway, when the cell input buffer 43 receives an RM cell indicating a state of congestion, the congestion detecting section 42 checks the DIR bit 21 and the CI bit 22 of the RM cell. Based on these values, the congestion detecting section 42 is able to detect a congestion state of the ATM network in a transmitting direction. During the congestion state, the congestion detecting section 42 outputs a signal to lessen an output rate of the cell output buffer 41 in accordance with a designated cell rate obtained from the ER field 24 of the RM cell. At the same time, the congestion detecting section 42 starts the TCP data gram discriminating section 48 and the packet discard controlling section 46. The TCP data gram discriminating section 48 discriminates a TCP data gram from a packet received from the transmitting terminal during the congestion state. The TCP data gram discriminating section 48 then sends the sequence number of the TCP data gram to the ACK generating section 49. The ACK generating section 49 sets an ACK number equal to the sequence number (the window value is not added in this case), and sets a window size equal to "0" so as to generate an ACK packet of the TCP data gram.

The ACK packet is sent to the transmitting terminal of the TCP data gram. Thus, the transmitting terminal recognizes that the data cannot be received due to no available buffer space for receiving the data in the receiving terminal. A data transmission is then stopped. After the stop of data transmission, the transmitting terminal periodically transmits a probe packet so as to try to reestablish a data transmission to the receiving terminal. The packet received from the transmitting terminal during the congestion state is retransmitted from the transmitting terminal after congestion release by the transmission by the receiving terminal of an ACK packet having a non-zero window size. Therefore, the packet discard controlling section 46 discards all the packets after the discrimination of the TCP data gram. Thus, the cell output buffer 41 does not receive any input during the congestion state, and nothing is transmitted onto the ATM network during this time.

When a non-congestion state (or congestion release) is detected in the ATM network and the NI bit is detected as being equal to "0", the output rate of the cell output buffer 41 is increased in the gateway by a signal provided to the cell output buffer 41 from the congestion detecting section 42. A processing is also stopped in the TCP data gram discriminating section 48, the ACK generating section 49 and the packet discard section 46 that are used during the congestion state. The probe packet continues to be transmitted periodically from the transmitting terminal. After the congestion release, the probe packet is not discarded in the receiving gateway, but reaches the receiving terminal. The receiving terminal then sends the ACK packet describing the available (non-zero) window size to the transmitting terminal.

Figure 5:
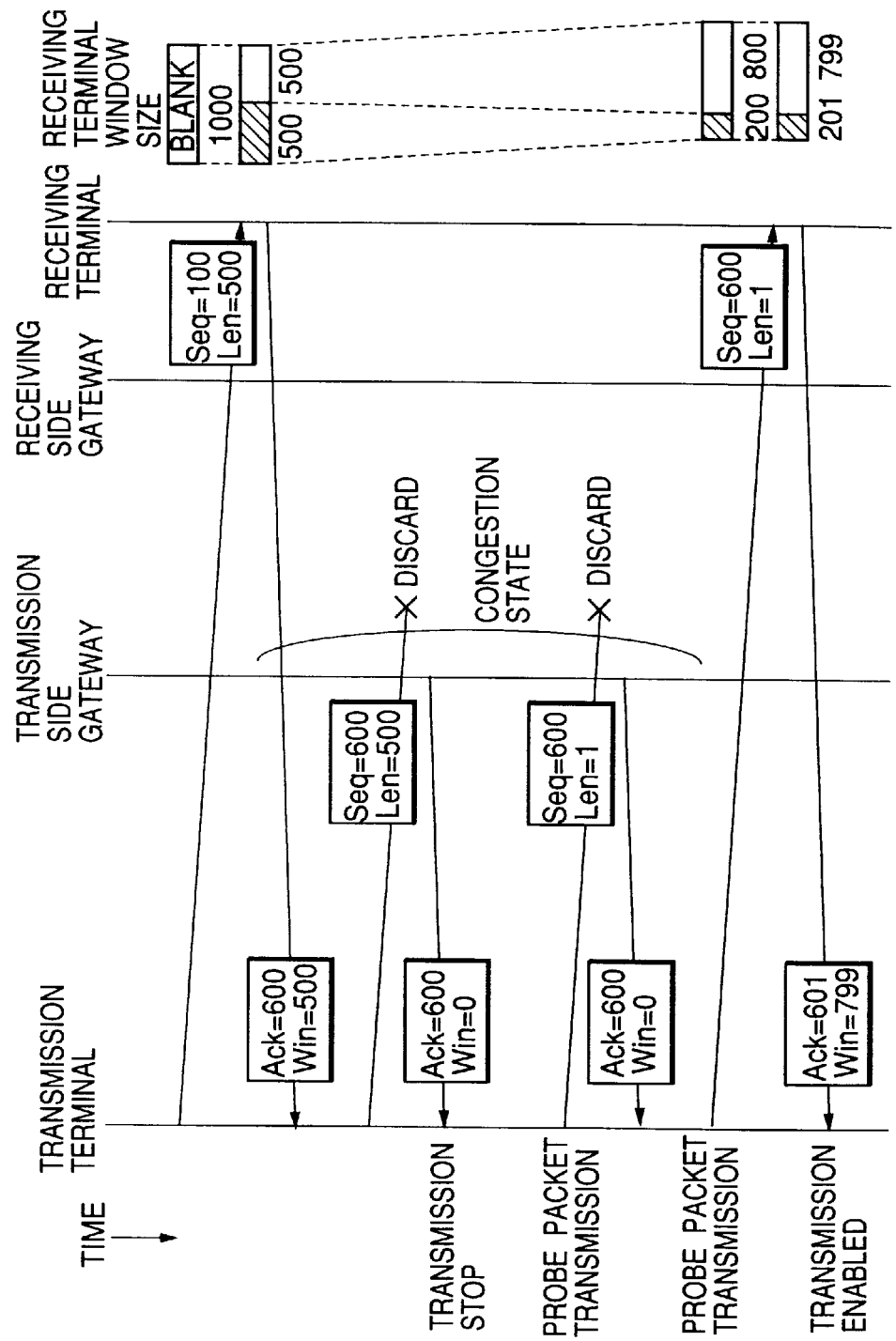
FIG. 5 shows a flow of a flow control during a congestion state, according to an embodiment of the present invention.
Figure 6:
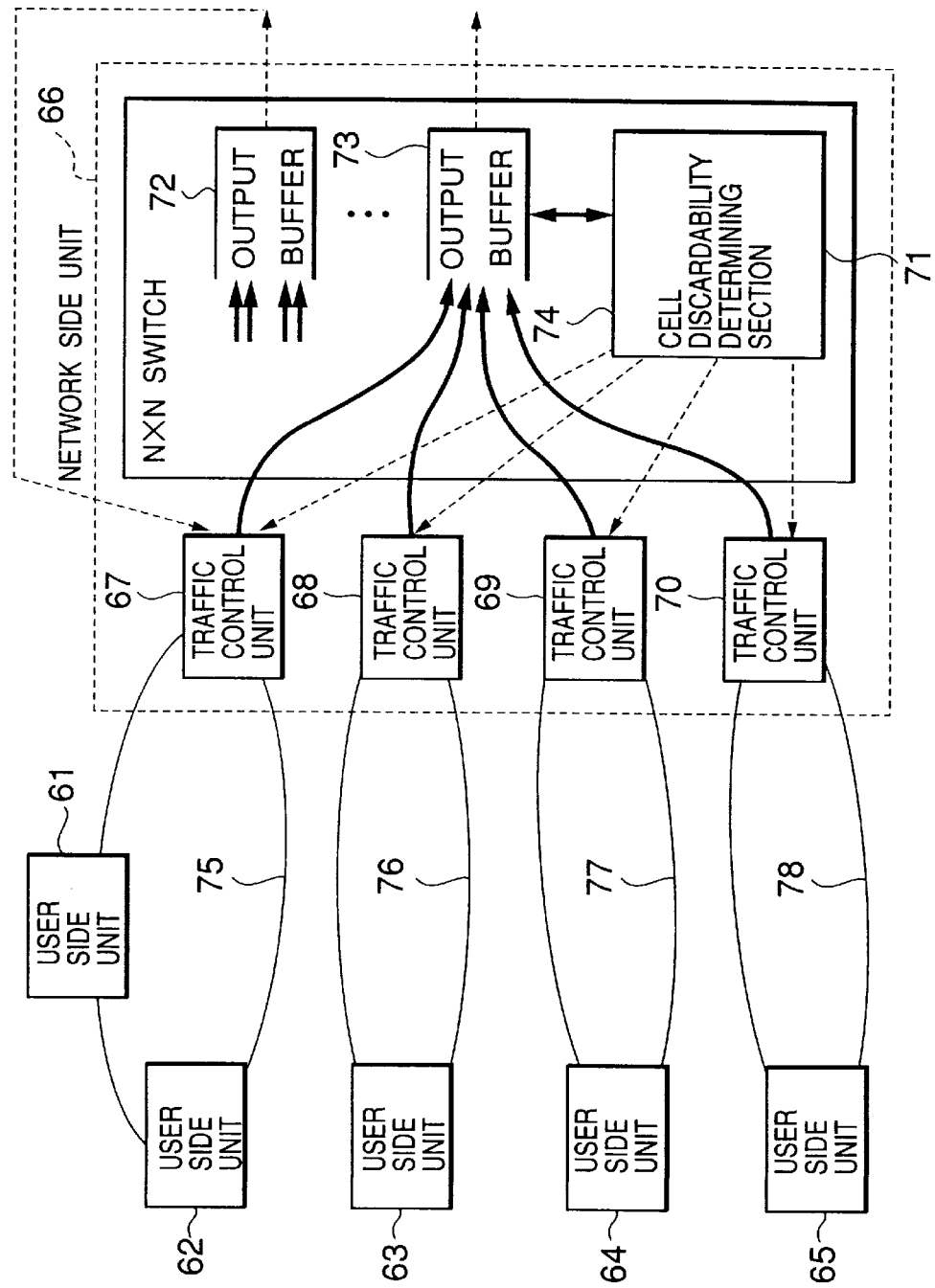
FIG. 6 shows a conventional flow control method.

Next, the operation of the embodiment of the present invention will be described in detail hereinbelow. FIG. 5 shows a series of operation sequences between the units during the congestion state.

When a cell congestion state is not detected in the ATM network, the communication between the transmitting and receiving terminals is performed by the data gram using a standard TCP protocol. The transmitting side gateway transmits a packet from the transmitting terminal. The packet is then transferred to the receiving terminal side. The transmitting terminal is window-controlled by the receiving terminal and the TCP protocol so as to transmit data having a size which does not exceed the window size of the receiving terminal (e.g., available buffer size to receive data). When the receiving terminal receives the TCP data gram, an ACK packet is sent to the transmitting terminal. It is noted that the ACK packet includes an ACK number that corresponds to the addition of the data length to the sequence number of the TCP data gram, and the window size available after the receipt of the TCP data gram by the receiving terminal.

When the transmitting gateway detects a congestion state, the TCP data gram is discriminated from the packet received from the transmitting terminal during the congestion state. The discriminated received TCP data gram is not transferred to a relay network (e.g., ATM network), but is discarded. At the same time, an ACK packet is sent from the gateway to the transmitting terminal of the TCP data gram. Here, the ACK packet is arranged so that the ACK number is set equal to the sequence number of the discarded TCP data gram and the window size is set equal to "0". When the transmitting terminal receives the ACK packet, the transmitting terminal recognizes that data cannot be received by the receiving terminal due to the absence of an available region for the data reception in the receiving terminal (since the window size is set to "0"). Thus, the data transmission is stopped. After the stop of the data transmission, the transmitting terminal periodically transmits a probe packet having the data length of "1" in accordance with the TCP protocol. Also, while the transmitting side gateway sends an ACK packet having the window size of "0" to the transmitting terminal of the TCP data gram, and the data transmission is not restarted between the transmitting terminal and the receiving terminal.

When the transmitting gateway detects the congestion release (e.g., a non-congestion state), a packet received from the transmitting terminal is not discarded, but passes through to the receiving terminal side. Thus, the probe packet, which is periodically transmitted from the transmitting terminal after the stop of transmission, is transferred to the receiving terminal for the first time after the detection of congestion release. When the receiving terminal receives the probe packet, the ACK packet setting the available window size is sent from the receiving terminal to the transmitting terminal. Afterwards, the usual TCP data gram transfer is performed between the transmitting and receiving terminals in a transmission enabled mode.

In the method and system according to the present invention, a cell discard can be avoided in a gateway even during a congestion state and a throughput can be increased in an ATM relay network and between terminals.

The reason for increased throughput is as follows. During the congestion state in the ATM relay network, the congestion state is detected in the gateway. A pseudo acknowledgment is sent to a transmitting terminal on an existing LAN so as to indicate that a receiving terminal cannot receive data. Therefore, it is possible to stop the transmission of a TCP data gram from the transmitting terminal itself. Furthermore, a feedback control for an ATM cell transmission by an RM cell and a TCP feedback control between the terminals is not doubly functioned.

Also, in the present invention, there is only a short delay between the detection of the state of congestion and commencement of flow control, and the time required to restart a TCP data gram transmission after congestion release can be reduced.

The reason for the shortened delay is as follows. As soon as the congestion state is detected, a packet received from the terminal is discarded in the gateway. The terminal transmits a TCP data gram and then periodically transmits a probe packet. The terminal has only to wait for a non-zero window size in the receiving terminal. Therefore, after congestion release, if a non-zero window size is indicated by the receiving terminal, a TCP data gram communication by the transmitting terminal is quickly made possible.

That is, according to the present invention, during the congestion state in the ATM relay network, the congestion state is detected in the gateway. For the duration of the congestion, when the TCP data gram is transmitted from the terminal, a pseudo ACK is sent by the gateway to the transmitting terminal on the existing LAN, so as to indicate that the receiving terminal cannot receive the data. Therefore, the transmission of TCP data gram from the transmitting terminal can be stopped. It is possible to avoid excessive cell discarding in a gateway unit and thus a data retransmission caused by the cell discarding.

Moreover, during the congestion state, the pseudo ACK is sent by the gateway in response to the probe packet sent from the transmitting terminal, so as to indicate to the transmitting terminal that the receiving terminal cannot receive the data. Thus, the TCP data gram transmission from the transmitting terminal is put in a stand-by state. Therefore, it is possible to restrain an excess TCP data gram transmission during the congestion state. It is possible to reduce a load applied to the LAN and increase a throughout between the terminals.

Furthermore, since the packet received from the terminal is discarded in the gateway from the detection of a state of congestion, a delay can be reduced prior to the start of flow control.

While a preferred embodiment has been described herein, modification of the described embodiment may become apparent to those of ordinary skill in the art, following the teachings of the invention, without departing from the scope of the invention as set forth in the appended claims.

What is claimed is:

1. A method for controlling a flow between terminals in an ATM network, said ATM network comprising:

a gateway unit for accommodating a first LAN, for converting a first packet transmitted from the first LAN into a plurality of ATM cells, for transferring the ATM cells to the ATM network, for converting ATM cells received from the ATM network into a second packet and for transferring the second packet to the first LAN;

an ATM switch disposed in the ATM network, for transferring the ATM cells to a predetermined path in accordance with a VPI and a VCI of the ATM cells, for detecting a state of congestion and for sending an RM cell to the gateway unit, the RM cell including information concerning the detected congestion; and a transmitting terminal disposed in the first LAN, for communicating with a receiving terminal in a second LAN via the ATM network by the first packet including a TCP data gram, wherein the gateway unit adjusts, by a read from an output buffer, a cell output rate to a VC congested in accordance with a cell rate written in the RM cell received when the congestion is detected from the RM cell;

sends a pseudo ACK packet to the transmitting terminal so as to stop the transmission of the TCP data gram received from the first LAN to the congested VC, the ACK packet indicating that the receiving terminal cannot receive the data; and discards all the packets passing through the congested VC transmitted from the transmitting terminal during the detection of congestion.

2. The method according to claim 1, wherein said adjusting step of the gateway unit comprises:

a first adjusting step for previously deciding a priority in the transmitting terminal and for controlling the transmission of the TCP data gram transmitted from a low priority terminal when no increase of cell rate of the gateway unit is discriminated from said RM cell congestion information; and a second adjusting step for controlling the transmission of the TCP data gram transmitted from all the terminals when no increase of cell rate and a congestion detection are discriminated.

3. The method according to claim 1, wherein said sending step of the gateway unit comprises:

sending a pseudo ACK packet to the transmitting terminal so as to hold the cell exceeding a threshold in the output buffer limiting the cell output to the ATM network and so as not to discard the cell during the detection of congestion by the RM cell, the pseudo ACK packet indicating that the receiving terminal cannot receive the TCP data gram transmitted from the transmitting terminal when the cell exceeding the threshold is held in the output buffer.

4. The method according to claim 1, wherein said discarding step of the gateway unit comprises:

a discarding step for sending a pseudo ACK packet to the transmitting terminal and for discarding all the packets from the transmitting terminal so as to stop the transmission of TCP data gram when no increase of cell rate and a congestion generating state are discriminated, the pseudo ACK packet indicating that the receiving terminal cannot receive the TCP data gram to be transmitted to the congested VC.

5. The method according to claim 4, where said discarding step of the gateway unit further comprises:

a second discarding step for discarding, by the gateway unit, all the packets alone including a user data protocol (UDP) data gram to the congested VC from the receiving terminal when no increase of cell rate of the gateway unit is discriminated from the RM cell congestion information.

6. A method of congestion control in a communication network that includes a first terminal connected to a first LAN, the first LAN being connected to an ATM network by way of a first gateway, the ATM network providing a connection via a second gateway to a second LAN in which a second terminal is connected, the method comprising the steps of:

transmitting a data packet from the first terminal that is destined for the second terminal;

determining if a state of congestion currently exists in the ATM network;

if the state of congestion does not currently exist, sending the data packet over the ATM network and to the second terminal; and if the state of congestion currently exists, sending a pseudo acknowledge packet from the first gateway to the first terminal, wherein the pseudo acknowledge packet informs the first terminal that the second terminal is not currently capable of receiving any data packets, and wherein, when the first terminal receives the pseudo acknowledge packet, the first terminal stops normal data communication and enters a probe packet transmission state in which the first terminal periodically sends probe packets to the ATM network via the first gateway to determine when the state or congestion is over.

7. A method of congestion control in a communication network that includes a first terminal connected to a first LAN, the first LAN being connected to an ATM network by ay of a first gateway, the ATM network providing a connection via a second gateway to a second LAN in which a second terminal is connected, the method comprising the steps of:

transmitting a data packet from the first terminal that is destined for the second terminal;

determining if a state of congestion currently exists in the ATM network:

if the state of congestion does not currently exist, sending the data packet over the ATM network and to the second terminal; and if the state of congestion currently exists, sending a pseudo acknowledge packet from the first gateway to the first terminal, wherein the pseudo acknowledge packet informs the first terminal that the second terminal is not currently capable of receiving any data packets, and wherein the pseudo acknowledge packet is created by the first gateway and sent to the first terminal, to make it appear to the first terminal that the second terminal is not capable of receiving any data packets irrespective as to whether or not that condition is true.

8. In a flow control system for limiting a data transmission from a transmitting terminal during a congestion in an ATM network interconnecting LANs, a gateway unit for accommodating a user LAN, for converting a first packet transmitted form the user LAN into a plurality of ATM cells, for transferring the ATM cells to the ATM network, for converting ATM cells received from the ATM network into a second packet and for transferring the second packet to the user LAN, the gateway unit comprising:

a cell output buffer for transmitting the ATM cells to the ATM network;

a cell input buffer for receiving the ATM cells from the ATM network;

a packet receiving buffer for receiving the first packet from a first LAN;

a cell forming section for forming the first packet into the ATM cell;

a packet assembling section for assembling the ATM cells received from the ATM network into the second packet;

a packet transmitting buffer for transmitting the second packet to the first LAN;

a congestion detecting section for detecting a state of congestion as indicated in an RM cell to be transmitted from the ATM network;

a packet discard controlling section for discarding the received packet during the state of congestion;

a TCP data gram discriminating section for discriminating a TCP data gram from the first packet received from the first LAN during said RM cell congestion detection and for acquiring a sequence number of the TCP data gram; and an ACK generating section for generating an ACK packet so as to stop a TCP data transmission to the transmitting terminal, said ACK packet being arranged so that an ACK number is set equal to the sequence number of the received TCP data gram and a window value is set equal to a predetermined value.

9. The system according to claim 8, wherein the predetermined value is equal to zero.

10. A flow control system for providing flow of data between a source and a destination, comprising:

a gateway configured to provide a communications path from the source to an ATM network, the gateway including, a source cell input buffer configured to receive data from the source to be transmitted over the ATM network as packets;

an ATM cell input buffer configured to receive a resource management packet from the ATM network, the resource management packet indicating whether or not the ATM network is congested; and a pseudo acknowledge generating section for sending a pseudo acknowledge data to the source when the ATM network is congested, wherein the source, in response to the pseudo acknowledge data received from the gateway, enters a probe packet transmission mode in which probe packets that are destined for the destination are periodically sent over the ATM network to determine when the congestion has ended.

* * * * *